April 5, 1949.  M. J. HERZBERGER  2,466,424
FOUR COMPONET HIGHLY CORRECTED WIDE ANGULAR
FIELD OBJECTIVE WITH SMALL PETZVAL SUM
Filed Feb. 18, 1946
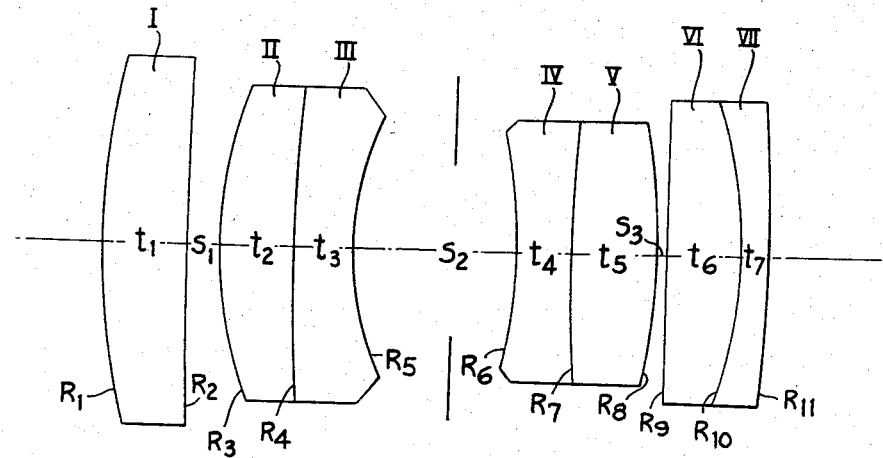
| EF = 100 mm. | | | | f/4.5 |
|---|---|---|---|---|
| LENS | N | V | RADII | THICKNESSES |
| I | 1.620 | 60.3 | $R_1$ = + 55.6 mm. | $t_1$ = 6.2 mm. |
|  |  |  | $R_2$ = +103.6 | $s_1$ = 2.7 |
| II | 1.697 | 56.1 | $R_3$ = + 31.9 | $t_2$ = 6.0 |
| III | 1.575 | 41.4 | $R_4$ = +150.0 | $t_3$ = 4.2 |
|  |  |  | $R_5$ = + 22.2 | $s_2$ = 11.8 |
| IV | 1.575 | 41.4 | $R_6$ = − 30.0 | $t_4$ = 4.1 |
| V | 1.638 | 55.5 | $R_7$ = +184.2 | $t_5$ = 6.3 |
|  |  |  | $R_8$ = − 42.6 | $s_3$ = 0.65 |
| VI | 1.744 | 45.8 | $R_9$ = ∞ | $t_6$ = 5.5 |
| VII | 1.605 | 38.0 | $R_{10}$ = − 33.9 | $t_7$ = 2.1 |
|  |  |  | $R_{11}$ = − 123.8 | BF = 75.8 |
MAXIMILIAN J. HERZBERGER
INVENTOR
BY
ATT'Y & AG'T

# UNITED STATES PATENT OFFICE 2,466,424

FOUR COMPONENT HIGHLY CORRECTED WIDE ANGULAR FIELD OBJECTIVE WITH SMALL PETZVAL SUM

Maximilian J. Herzberger, Rochester, N. Y., assignor to Eastman Kodak Company, Rochester, N. Y., a corporation of New Jersey Application February 18, 1946, Serial No. 648,515

2 Claims. (Cl. 88—57)

This invention relates to photographic objectives of the type consisting of two strongly meniscus compound negative components concave toward each other and aligned between two positive components, at least one of which is compound.

It is an object of the invention to provide a lens having an extremely sharp and highly corrected image over an angular field of ±15° to ±25°. By means of the invention I have been able to obtain almost "critical" definition, in the technical sense of the word, over the smaller field indicated, using an aperture of f/4.5, and to produce very superior definition over the larger field even with an aperture of f/2.5.

The type of objective described above to which the invention relates is a well known and highly developed lens type usually found suitable for covering a field of 25° to 30°. It is well known in the lens designing art to adapt a lens to cover a smaller angular field by adjusting the Petzval sum to a smaller positive residual or even slightly negative and thereby obtaining the best correction of curvature of field and astigmatism. This feature may be combined with the present invention by the known arrangement of making the meniscus components unusually thick; preferably they are between 0.08 F and 0.14 F where F is the focal length of the objective.

According to the invention, the front and rear positive components have comparatively small total dioptric power in their bounding surfaces (i. e. their glass-air surfaces), at least one of these components has a cemented surface of positive power at which the two media differ by at least 0.05 in refractive index, and the front surface of the front negative component is unusually strong.

By "front" is meant that side of the lens which faces the longer conjugate for which the lens is corrected.

Preferably the algebraic sum of the dioptric powers of the two bounding surfaces of the front component is between 0.3 P and 0.6 P where P is the dioptric power of the objective, that of the two bounding surfaces of the rear component is between 0.4 P and 0.7 P. The sum of all four should be between 0.8 P and 1.2 P.

At least one of the positive components has a cemented surface of positive power at which the two media differ in refractive index by more than 0.05 and preferably less than 0.25. I have found that such a surface is very effective in controlling the zonal spherical aberration, particularly when it is concave toward the incident light. By balancing the primary aberration contributed by this surface and that contributed by the front surface of the front negative component in such a way that the sum of the two contributions remains approximately constant but each one is varied individually, the zonal spherical aberration is readily controlled and given whatever residual value is thought best for the particular purpose in mind.

A lens designer may find it advantageous to change the refractive index of one of the media bounded by a cemented surface of this kind. For example this may be useful in correcting the color aberrations with available types of glass or in controlling the Petzval sum. It will usually be found that neither the radius nor the focal length of the surface in question varies proportionately with the index difference, but something between these two limits is found best to maintain the correction of the zonal spherical aberration. As a roughly approximate rule it may be advisable to maintain approximately constant the dimensionless coefficient $$\frac{p}{P} - 2\Delta N$$

when substituting a new refractive index, where $p$ is the dioptric power of the surface in question, and $\Delta N$ is the difference in the refractive indices of the media on the two sides of the said cemented surface. In the preferred form of objective in which there is only one cemented surface of this kind, it is favorable to the correction of zonal aberration to hold this coefficient between the limits +0.05 and +0.20 and in any case the sum of the values of this coefficient for all such surfaces in the objective should be less than +0.30. The radius of curvature of the front surface of the front negative component should be between 0.28 F and 0.40 F to cooperate therewith in eliminating both marginal and zonal aberration.

The shape of the front component is not extremely critical to the working of the invention. It is found convenient, as usual, to vary this shape during the design of a lens of this type in order to aid in correcting the curvature of field. In the particular examples given, it was found that a meniscus shape in which the concave rear surface of this component has a radius of curvature greater than two-thirds F gave a suitable flat field. For similar reasons, it was found convenient to make the radius of curvature of front surface of the rear component numerically greater than 1.5 F and that of the concave front surface of the rear negative component less than 0.5 F and greater than that of the concave rear surface of the front negative component.

It is known that the use of high-index glass in the positive elements of objectives broadly of this type is in general favorable to the correction of zonal astigmatism and zonal spherical aberration, and it has become usual to use glass with refractive index higher than 1.6 in these elements. In combining this feature with the present invention, I find it to be particularly advantageous that the medium on the concave side of the cemented surface described above as forming an important feature of the invention should have a refractive index greater than 1.70. In order to obtain color correction in combinations with known types of glass, the dispersive index of this medium should also be high. For example it should be greater than about 35 for a refractive index of 1.70, but it is not necessarily quite so high for higher refractive indices. The desirable limit varies roughly in such a way that the sum $(V+50\,N)$ is greater than 120.

In regard to the remaining structural details of the objective, I have found that favorable results are obtained when these are similar to those ordinarily found in known objectives of this type.

The accompanying drawing shows an objective according to the invention and gives the structural details. This corresponds to the first of the following two examples which are given for a focal length of 100 mm.:

Example 1     f/4.5

| Lens | N | V | Radii | Thicknesses |
|---|---|---|---|---|
| I | 1.620 | 60.3 | $R_1 = +\ 55.6$ mm. | $t_1 = 6.2$ mm. |
|   |       |      | $R_2 = +103.6$       | $s_1 = 2.7$ |
| II | 1.697 | 56.1 | $R_3 = +\ 31.9$ | $t_2 = 6.0$ |
| III | 1.575 | 41.4 | $R_4 = +150.0$ | $t_3 = 4.2$ |
|     |       |      | $R_5 = +\ 22.2$ | $s_2 = 11.8$ |
| IV | 1.575 | 41.4 | $R_6 = -\ 30.0$ | $t_4 = 4.1$ |
| V  | 1.638 | 55.5 | $R_7 = +184.2$ | $t_5 = 6.3$ |
|    |       |      | $R_8 = -\ 42.6$ | $s_3 = 0.65$ |
| VI  | 1.744 | 45.8 | $R_9 = \infty$ | $t_6 = 5.5$ |
| VII | 1.605 | 38.0 | $R_{10} = -\ 33.9$ | $t_7 = 2.1$ |
|     |       |      | $R_{11} = -123.8$ | $BF = 75.8$ |

Example 2.     f/2.5

| Lens | N | V | Radii | Thicknesses |
|---|---|---|---|---|
| I | 1.620 | 60.4 | $R_1 = +\ 55.7$ mm. | $t_1 = 5.8$ mm. |
|   |       |      | $R_2 = +118.4$ | $s_1 = 2.7$ |
| II | 1.697 | 56.1 | $R_3 = +\ 36.0$ | $t_2 = 6.1$ |
| III | 1.575 | 41.4 | $R_4 = +189.0$ | $t_3 = 5.0$ |
|     |       |      | $R_5 = +\ 24.2$ | $s_2 = 11.7$ |
| IV | 1.575 | 41.4 | $R_6 = -\ 30.2$ | $t_4 = 4.2$ |
| V  | 1.620 | 60.4 | $R_7 = +297.8$ | $t_5 = 6.2$ |
|    |       |      | $R_8 = -\ 40.7$ | $s_3 = 0.6$ |
| VI  | 1.744 | 45.8 | $R_9 = \infty$ | $t_6 = 5.5$ |
| VII | 1.617 | 38.5 | $R_{10} = -\ 36.6$ | $t_7 = 2.1$ |
|     |       |      | $R_{11} = -118.4$ | $BF = 74.6$ |

In these objectives the front and rear components have comparatively little power in their glass-air surfaces, $R_1$, $R_2$, $R_9$ and $R_{11}$. One of these components, the rear one in these instances, is compound and has a cemented surface $R_{10}$ of positive power at which the difference in refractive indices $N_{VI}$ and $N_{VII}$ is 0.14 and 0.13 in the two cases, which is greater than 0.05. Also the front surface $R_3$ of the front negative component II, III, is unusually strong, in fact its radius of curvature is considerably less than 0.40 F in both cases. Thus these examples embody all the broad features of the invention.

These broad features along with a number of preferred features are set forth in the following table:

| Preferred Range | Ex. 1 | Ex. 2 |
|---|---|---|
| $p_1 = \dfrac{N_I - 1}{R_1}$ | $+1.11P$ | $+1.11P$ |
| $p_2 = \dfrac{N_I - 1}{-R_2}$ | $-0.60P$ | $-.52P$ |
| $0.3P < (p_1 + p_2) < 0.6P$ | $+0.51P$ | $-0.59P$ |
| $p_9 = \dfrac{N_{VI} - 1}{R_9}$ | $0.00P$ | $0.00P$ |
| $p_{11} = \dfrac{N_{VII} - 1}{-R_{11}}$ | $+0.50P$ | $+0.52P$ |
| $0.4P < (p_9 + p_{11}) < 0.7P$ | $+0.50P$ | $0.52P$ |
| $0.8P < (p_1 + p_2 + p_9 + p_{11}) < 1.2P$ | $+1.01P$ | $+1.11P$ |
| $0.05 < (N_{VI} - N_{VII}) < 0.25$ | $+0.139$ | $+0.127$ |
| $2\Delta N = 2(N_{VI} - N_{VII})$ | $0.278$ | $0.254$ |
| $\dfrac{p}{P} = \dfrac{F \Delta N}{R_{10}}$ | $0.410$ | $0.347$ |
| $+0.05 < (p/P - 2\Delta N) < +0.30$ | $0.132$ | $0.093$ |
| $0.28F < R_3 < 0.40F$ | $+0.319F$ | $+0.360F$ |

KNOWN FEATURES COOPERATING WITH THE FEATURES OF THE INVENTION:

| | | |
|---|---|---|
| $0.08F < (t_2 + t_3) < 0.14F$ | $0.102F$ | $0.111F$ |
| $0.08F < (t_4 + t_5) < 0.14F$ | $0.104F$ | $0.104F$ |
| $2F/3 < +R_7$ | $1.0F$ | $1.2F$ |
| $1.5F < \pm R_2$ | | |
| $0.15F < R_5 < 0.3F$ | $+0.22F$ | $+0.24F$ |
| $R_5 < -R_6 < 0.5F$ | $0.30F$ | $0.30F$ |
| $1.7 < N_{VI}$ | $1.744$ | $1.744$ |
| $36 < V_{VI}$ | $46.$ | $46.$ |

Thus every essential and preferred feature of the invention is embodied in each of these examples.

What I claim is:

1. A photographic objective of the type consisting of two positive components and aligned therebetween two compound meniscus negative components concave toward each other and between 0.08 F and 0.14 F thick where F is the focal length of the objective, characterized by the rear surface of the front positive component being concave and having a radius of curvature greater than 2 F/3, by the algebraic sum of the dioptric powers of the two glass-air surfaces of the front positive component being between 0.3 P and 0.6 P, where P is the power of the whole objective, by the like sum for the rear positive component being between 0.4 P and 0.7 P, by the aggregate sum for both components being between 0.8 P and 1.2 P, by the radius of curvature of the front surface of the front negative component being between 0.28 F and 0.40 F, and by the rear positive component having a cemented surface concave toward the front and with positive power $p$, the two media bounded thereby differing in refractive index by $\Delta N$ such that $\Delta N$ is greater than 0.05 and $$\frac{p}{P} - 2\Delta N$$

has a value between $+0.05$ and $+0.30$.

2. An objective consisting of a simple positive element and three cemented doublets axially aligned therebehind, in which the indices N, radii R, thicknesses $t$, and spaces $s$, each numbered by subscripts from front to rear, are within the ranges specified in the following table:

$1.6 < N_1 < 1.65$
$1.65 < N_2 < 1.75$
$1.55 < N_3 < 1.65$
$1.55 < N_4 < 1.65$
$1.58 < N_5 < 1.68$
$1.70 < N_6 < 2.00$
$0.05 < (N_6 - N_7) < 0.25$ $0.5\ F < +R_1 < 1.2\ F$
$0.66\ F < +R_2$
$0.25\ F < +R_3 < 0.40\ F$
$0.7\ F < \pm R_4$
$0.15\ F < +R_5 < 0.3\ F$
$+R_5 < -R_6 < 0.5\ F$
$0.7\ F < \pm R_7$
$0.3\ F < -R_8 < 0.7\ F$
$1.5\ F < \pm R_9$
$0.25\ F < -R_{10} < 0.5\ F$
$0.7\ F < -R_{11} < 1.8\ F$
$0.03\ F < t_1 < 0.12\ F$
$0.08\ F < (t_2 + t_3) < 0.14\ F$
$0.08\ F < (t_4 + t_5) < 0.14\ F$
$0.04\ F < (t_6 + t_7) < 0.12\ F$
$0.00 < s_1 < 0.08\ F$
$0.06\ F < s_2 < 0.20\ F$
$0.00 < s_3 < 0.08\ F$ where F is the focal length of the objective and where < means "is less than," and the + and − signs indicate surfaces convex and concave to the front respectively.

MAXIMILIAN J. HERZBERGER.

REFERENCES CITED

The following references are of record in the file of this patent:

UNITED STATES PATENTS

| Number | Name | Date |
|---|---|---|
| 2,262,998 | Frederick et al. | Nov. 18, 1941 |
| 2,343,627 | Aklin | Mar. 7, 1944 |
| 2,350,035 | Herzberger | May 30, 1944 |